United States Patent Office
3,447,955
Patented June 3, 1969

3,447,955
PROCESS FOR SEALING CEMENT CONCRETE SURFACES
Clifford V Wittenwyler, Union, and John E. Magee, East Orange, N.J., assignors to Shell Oil Company, New York, N.Y., a corporation of Delaware
No Drawing. Filed Sept. 22, 1965, Ser. No. 489,400
Int. Cl. C04b 41/28; C09d 3/58
U.S. Cl. 117—123          8 Claims

ABSTRACT OF THE DISCLOSURE

Concrete surfaces may be protected from excess loss of moisture during the first few days of curing after pouring by applying to said freshly poured concrete surface a composition comprising (1) an organic solvent, (2) a polyepoxide and (3) a polyimine containing at least one —C=N— group.

---

This invention relates to new surfacing compositions. More particularly, the invention relates to a new process and composition for sealing new concrete surfaces.

Specifically, the invention provides new portland cement concrete sealing compositions comprising polyepoxide resins and a polyimine curing agent, preferably in an organic solvent. The invention further provides a process for sealing cement concrete surfaces.

Conventionally, portland cement and other hydraulic cements, as used in concrete roadways, buildings and other construction applications, is kept wet during the initial stages of cure by any number of techniques such as flowing water over the surface for periods up to a week or more; covering the surface with a plastic sheet such as polyethylene; covering the surface with water-retaining materials including hay, straw, burlap, canvas and even soil; and spraying the surface with a wax emulsion or a plastic emulsion such as poly(vinyl acetate) emulsion. These techniques do, to a greater or lesser extent, reduce the loss of water from the concrete and thereby improve the structural properties. All of these techniques, however, provide only initial protection, i.e., protection for only a few days, or a couple of weeks, at the longest. This is adequate for the concrete to achieve strength but it is known that cement concrete surfaces are very susceptible to freezing and deicing salt damage for period up to two years or longer.

While there are surface coating compositions which can be applied to "old" or cured cement concrete surfaces such as polyepoxide-coal tar compositions disclosed in U.S. 3,033,088, there are currently no surface coatings which can be applied to "wet" or recently-poured cement concrete and which provide protection from severe water loss, deicing salts and the effects of freezing and thawing during the important 2–3 year "green period."

A composition has now been found which when applied to the wet surface of cement concrete not only significantly reduces the moisture loss from the concrete during the initial cure period, i.e., during the first 7–28 days, but remains on the surface to provide protection during the subsequent 2–3 years. In other words, the present compositions serve two important functions, i.e., they retain the moisture required for an effective curing during the first few days after pouring and then exclude water for the subsequent 2–3 years after initial cure. The present compositions can be applied in a simple step as by spraying or painting in thin layers thereby not only saving time but also saving expensive coating materials.

It is therefore an object of the present invention to provide coatings for cement concrete surfaces. It is another object to provide surface coatings for cement concrete which substantially reduce the loss of moisture during the first few days of curing after pouring. It is still another object to provide surface coatings for cement concrete which materially excludes water during the 2 to 3 years after the initial curing period thereby eliminating or reducing the damage resulting from the use of deicing salts and freeze-thaw cycles. A further object is to provide a simple process for coating the surface of cement concrete which coating not only facilitates the initial cure by retaining moisture but remains on the surface to provide protection against deicing salts and the effects of freezing and thawing during the subsequent 2–3 years "green period." These and other objects will become apparent to one skilled in the art from the following discussion and disclosure.

These and other objects may be accomplished by simply applying by any suitable means such as spraying or painting, a composition comprising an organic solution or dispersion of (1) a polyepoxide having a 1,2-epoxy-(vic-epoxy) equivalency greater than 1.0 and (2) certain imines, particularly the ketimines, to be more fully described hereinafter. Optionally, fillers, pigments and other resins such as phenol-aldehyde, melamine-aldehyde and urea-aldehyde resins may also be added as desired.

The polyepoxide materials used in preparing the compositions of the present invention comprise those organic materials which have more than one vic-epoxy group, i.e., more than one

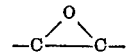

group, which group may be in a terminal position, i.e., a

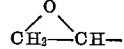

group, or in an internal position, i.e., a

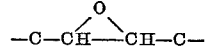

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene, 1,3 - bis(2,3 - epoxypropoxy)benzene, 4,4' - bis(2,3 - epoxypropoxy)diphenyl ether, 1,8 - bis(2,3 - epoxypropoxy)octane, 1,4 - bis(2,3-epoxypropoxy)cyclohexane, 4,4' - bis(2 - hydroxy - 3,4'-epoxybutoxy)diphenyl dimethylmethane, 1,3 - bis(4,5-epoxypentoxy) - 5 - chlorobenzene, 1,4-bis(3,4-epoxybutoxy) - 2 - chlorocyclohexane, 1,3-bis(2-hydroxy - 3,4-epoxybutoxy)benzene, 1,4 - bis(2 - hydroxy - 4,5 - epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2 - bis(4 - hydroxyphenol)butane, 4,4'-dihydroxybenzophenone, bis(4-hydroxyphenyl)ethane, 2,2 - bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3 - chloro - 1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy-polyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable such polyepoxide polyethers is illustrated in U.S. 2,633,458 as Polyether F.

Particularly preferred members of this group comprises the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of poly-basic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include among others, the epoxidized esters of polyethylenically unsaturated monocarboxylic acids, such as epoxidized linseed, soyabean, perilla, oiticica, tung, walnut and dehydrated castor oil, methyl linoleate, butyl linolineate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5 - epoxydodecyl)maleate, di(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate, and di(2,3 - epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4 - epoxyhexyl 3,4 - epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate and the like.

Another group of materials having internal epoxy groups include epoxidized esters of unsaturated monocarboxylic acids and polyhydric alcohols, such as ethylene glycol di-(2,3-epoxycyclohexanoate), glycerol tri(2,3 - epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6-diepoxycyclohexanedicarboxylate, dibenzyl 1,2,4,5-diepoxycyclohexane - 1,2 - dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymer (Hycar rubbers), butadiene-styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

Polyepoxides having an epoxy equivalent weight of between 350 and 4,000 are preferred. Polyepoxides having an average molecular weight above 500, as for example, between about 800 and 1500 and between about 2700 and 3100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the polyethers D and E, noted above, or may be a blend of resins in which one of them is a liquid grade, such as, a polyepoxide having an epoxy equivalent weight of between 225 and 290 and an average molecular weight of between 450 and 500 as represented by polyether A. Thus, a suitable mixture of polyepoxides is a mixture containing between 60% and 80% by weight of a solid polyepoxide derived from an epichlorohydrin and 2,2-bis(4-hydroxyphenyl)propane having an epoxy equivalent weight of between 1,650 and 2,050 and an average molecular weight of between 2,700 and 3,100 (see, for example, U.S. Patent 2,633,458, column 6, line 74 to column 7, line 9) and between 20% and 40% by weight of a liquid polyepoxide derived from an epihalohydrin and diphenylol propane having an epoxy equivalent weight of between 175 and 210, and an average molecular weight of between 350 and 400 (polyether A).

The polyepoxide may also be a blend of solid resins, and is preferably a blend of a resin having a melting point higher than 100° C., and preferably, a resin having a melting point in the range of 120–160° C., and a resin having a melting point below 80° C., and preferably a resin having a melting point in the range of 60–80° C., the melting point being determined according to Durrans' Mercury Method.

Very suitable polyepoxides are the glycidyl polyethers of 2,2-bis(4-hydroxyphenyl)propane having an average molecular weight between about 350 and 2900 and an epoxide equivalent weight between about 180 and 2500.

The polyimines suitable for use in the present compositions and process include the polyimines containing at least one —C=N— group and may be aliphatic, cycloaliphatic, aromatic or heterocyclic. The imine group may be in an open-chain or may be contained in a cyclic structure. The compounds may be saturated or unsaturated and may be substituted with substituents such as chlorine, ether radicals, ester groups, keto groups, amide groups and the like.

Examples of polyimines include, among others,

N,N-di(2-propylidene) 1,5-pentanediamine,
N,N-di(1-propylidene) 1,6-hexanediamine,
N,N-di(2-propylidene) 3-aza-1,5-pentanediamine,
N,N-di(2-butylidene) 1,4-cyclohexanediamine,
N,N-di(2-butylidene) 3,6-aza-1,8-octanediamine,
N,N-di(1-butylidene) 1,8-octanediamine,
N,N-di(2-propylidene) 1,4-benzenediamine,
N,N-di(2-propylidene) 2,2-bis(4-aminophenyl)propane,
N,N-di(2-butylidene) 2,2-bis(4-aminophenyl)sulfone,
N,N-di(2-butylidene) 2,2-bis(4-aminophenyl)methane,
N,N-di(4-methoxy-2-hexylidene) 2,2-bis(4-aminophenyl) propane,
N,N-di(4-chloro-2-hexylidene) 2,2-bis(4-aminophenyl) propane,
N,N-di(4-chloro-2-hexylidene) 1,5-pentanediamine,
N,N-di(2-methoxy-4-hexylidene) 1,5-pentanediamine,
N,N-di(3-allyl-6-octylidene) 1,5-pentanediamine,
N,N-dioctyl 1,5-pentanediimine,
N,N-diphenyl 1,6-octanediimine,
N,N-dioctyl 1,4-cyclohexanediimine,
N,N-diallyl 1,5-pentanediimine,
N,N-dipropyl 3-aza-1,5-pentanediimine,
N,N-dicyclohexyl 3,6-diaza-1,8-octanediimine,
N,N-dioctyl 3-aza-1,5-pentanediimine,
N,N-diallyl 1,4-benzenediimine,
N,N-dioctyl 2,2-bis(4-iminophenyl)propane,
N,N-dioctyl 2,2-bis(4-iminophenyl)methane,
N,N-dibutyl 2,2-bis(4-iminophenyl)sulfone, and
N,N-dicyclohexyl 2,2-bis(4-iminophenyl)methane.

The curing agents may be prepared by a variety of methods. They are preferably prepared by reacting a ketone or aldehyde with a polyamine. Examples of ketones that may be used for this purpose include, among others, methyl ethyl ketone, dimethyl ketone, diethyl ketone, dibutyl ketone, diisobutyl ketone, methyl isopropyl ketone, ethyl butyl ketone, methyl octyl ketone, methyl phenyl ketone, methyl cyclohexyl ketone, dioctyl ketone, allyl methyl ketone, chloroallyl methyl ketone, methyl cyclohexenyl ketone, methoxymethyl butyl ketone, 1,2-eicosanedione, 1,18-octadecanedione, and the like.

Preferred ketones to be used are the aliphatic, cycloaliphatic and aromatic ketones containing 3 to 25 and still more, preferably 3 to 12 carbon atoms, and the corresponding diketones having the keto groups separated by at least 2 carbon atoms.

Examples of aldehydes include, among others, acetaldehyde, propionaldehyde, chloropropionaldehyde, butyraldehyde, isobutyraldehyde, valeroaldehyde, caproic aldehyde, heptoic aldehyde, methacrolein, nicotinaldehyde, cinchoninaldehyde, 2-pyrancarboxaldehyde, tetrahydropyran-2-carboxyaldehyde, 2-furaldehyde, crotonaldehyde, acrolein, benzaldehyde, 1-naphthaldehyde, octanone dialdehyde, glutaraldehyde, 1-cyclohexene-1-carboxaldehyde, 1-cyclopentene-1-carboxaldehyde and 2,4-heptadiene-1-carboxaldehyde. Preferred aldehydes to be used include the aliphatic, cycloaliphatic and aromatic mono- and dialdehydes containing from 2 to 20 carbon atoms and still more preferably from 2 to 12 carbon atoms.

Examples of amines that may be used in reaction with the above-described ketones and aldehydes include, among others, xylylene diamine, p-phenylene diamine, diaminodiphenylsulfone, methylenedianiline, diamonidiphenylmethane, triaminobenzene, 2,3-diaminotoluene, 2,2′-diaminodiphenyl, 1,3-diamino-4-isopropylbenzene, 1,3-diamino-4,5-diethylbenzene, diaminostilbene, ethylenediamine, diethylamine, diethylenetriamine, triethylenetetramine, tetraethylenepentamine, diaminopyridine, N,N-diethyl-1,3-propanediamine, butylamine, octylamine, decylamine, benzylamine, aminobenzene, adducts of poly- epoxides and polyamines which still contain amine hydrogen, such as adducts of diethylenetriamine and glycidyl ethers of polyhydric phenols, or adducts of monoepoxides and polyamines which still contain amino hydrogen, such as adducts of diethylenetriamine and ethylene oxide, or adducts of polyamines and unsaturated nitriles, as acrylonitrile, and the like. Preferred amines include the primary aliphatic, cycloaliphatic and aromatic monoamines containing up to 20 carbon atoms and the aliphatic, cycloaliphatic and aromatic amines containing at least one primary amino group and up to 20 carbon atoms.

The imines may be prepared by methods disclosed in U.S. 2,533,723, U.S. 2,692,284, U.S. 2,765,340 and U.S. 2,692,283.

Particularly preferred polyimines are the ketimines prepared by reacting an aliphatic or aromatic, but preferably an aliphatic, amine containing at least one primary amino group, i.e., —NH$_2$ group and containing up to 20 carbon atoms with an aliphatic ketone containing from 3 to 12 carbon atoms. These ketimines may be modified with glycidyl ethers such as phenyl glycidyl ether or modified with glycidyl esters such as the glycidyl esters of the aliphatic, saturated alpha-alpha-dialkyl monocarboxylic acids containing from 9–19 carbon atoms in the acid molecule.

The preparation of several preferred ketimines are as follows:

Preparation of N,N-di(4-methyl-2-pentylidene)-m-xylylenediamine 73 parts of meta-xylylenediamine were combined with 110 parts of methyl isobutyl ketone and 100 parts of benzene. The mixture was refluxed using a phase separator. The benzene that separated was returned to the reactor and the water separated was removed. When the theoretical amount of water had been recovered, the reaction was stopped. The mixture was then distilled to yield N,N-di(4-methyl-2-pentylidene)-m-xylylenediamine having a boiling range of 180–188° C. (1 mm. Hg).

Preparation of 2,4,12,14-tetramethyl-5,8,11-triaza-4-11-pentadecadiene

An excess of methyl isobutyl ketone (MIBK) was refluxed at boiling point with diethylenetriamine. The water obtained by condensation of the vapor in a phase separator was not returned to the reaction vessel. When a theoretical amount of water was obtained in the phase separator, the reaction was stopped. The excess MIBK was then removed by distillation and the residue purified under reduced pressure. The boiling point of the residue was 125–138° C. at 1 mm. Hg.

Preparation of the methyl isobutyl ketone-ethylene diamine adduct

The ketimine prepared by reacting an excess of methyl isobutyl ketone with ethylenediamine has a boiling point at 1 mm. Hg of 91–92° C.

The polyepoxides and ketimines can be combined in a variety of proportions. In most cases, however, it is preferred to combine the polyepoxide with at least 0.5 equivalent of the ketimine. As used herein, "equivalent" means the amount of the ketimine which furnishes one-half of a

group per epoxy group. Preferably the components are combined in a chemical equivalent ratio varying from 0.5:1 to 1.5:1.

The polyepoxide is preferably dissolved or suspended in a suitable organic solvent.

Suitable solvents include the aliphatic alcohols containing up to about 5 carbon atoms such as methanol, ethanol, n-propanol, iso-propanol, n-butanol, iso-butanol, pentanols; ketones such as acetone, methyl ethyl ketone, cyclohexanone and acetophenone; ethers such as tetrahydrofuran, diethyl ether, dibutyl ether and 1,4-dioxane; ether-alcohols such as ethylene glycol monoethyl ether, ethylene glycol monobutyl ether, diethylene glycol monoethyl ether, diethylene glycol monobutyl ether, diethylene glycol diethyl ether, triethylene glycol monoethyl ether; esters such as ethyl acetate, butyl acetate, etc.; and aromatic solvents such as benzene, toluene and xylene. Blends of the various solvents may also be employed.

A very good solvent was found to contain from 70–95% by volume of an aromatic hydrocarbon such as xylene and from 5 to 30% by volume of an aliphatic alcohol containing up to 5 carbon atoms such as n-butyl alcohol.

In general, the amount of solvent will vary considerably depending upon the application techniques utilized. Usually at least a 15% by weight solution of the polyepoxide is employed and more generally at least a 25% solution and most generally at least a 50% solution of polyepoxide is employed. In other words, the weight ratio of polyepoxide to solvent will range from about 1:20 to 2:1.

Suitable fillers which may be employed as desired include, among many others, aluminum powder, mica, bentonites, clay, synthetic resin and elastomers, ignited $Al_2O_3$ short-fiber asbestos, wood flours, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide may range from about 10 to 100 phr.

In order to increase the reflectibility of the surface coating thereby increasing the water or moisture retention and for other reasons it is generally desirable, although not necessary, to employ one or more pigments such as titanium dioxide, zinc oxide, zinc sulfide, lead carbonate, etc. The quantity of pigment employed may generally range from about 1 to 50 phr (parts per one hundred parts of epoxide) or more, but because of economic considerations, from about 5 to 25 phr. are usually employed.

It is sometimes desirable to add up to 25 phr. (parts per one hundred parts of polyepoxide) of a urea-aldehyde, melamine-alde- or phenol-aldehyde resin in order to improve the film-forming properties of the surface coatings. Preferred are the urea-formaldehyde resins and most preferred are the so-called butylated urea-formaldehyde resins. These resins are commercially obtainable and their preparation is well-known in the art. For example, the preparation of suitable phenol-formaldehyde resins and urea-formaldehyde resins can be found in "The Chemistry of Synthetic Resins," Ellis, chapters 13–22 and 26–32, Reinhold Publishing Company (1935).

In general, the amount of polepoxide solution to be applied to concrete surfaces will depend upon many factors such as solids concentration of the solution and degree of moisture retention desired. In general, however, the present solutions may be applied in the range from about 75 square feet per gallon to 300 square feet per gallon with from about 100 to 200 square feet per gallon being preferred. It will be appreciated that one skilled in the art may vary the amount applied considerably depending upon the solids to solvent ratio and the like. Accordingly, one skilled in the art can conveniently adjust the amount of solution applied to fit his particular solution concentration and needs. Stated on another basis, generally from about 10 grams to 50 grams of polyepoxide is applied per square foot of surface with greater or lesser amounts being employed as desired.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLE I

The following polyepoxide resin composition was prepared:

| | Parts by weight |
|---|---|
| Glycidyl polyether of 2,2-bis(4-hydroxyphenyl)propane having an average molecular weight of about 1060 and an approximate epoxide equivalent weight of about 650 | 1000 |
| Xylene | 800 |
| n-Butyl alcohol | 200 |
| Silica flour filler | 1000 |
| $TiO_2$ | 100 |
| A butylated urea-formaldehyde resin containing 60% solids, 35% butyl alcohol and 5% xylol; acid No. of solid resin, ½–2; viscosity (Gardner-Holdt) S–V; color (Gardner), 1–[Beetle 216–8 marketed by American Cyanamid Company] | 50 |

The above resin composition had a viscosity of 720 centipoises. After 150 parts by weight of 2,4,12,14-tetramethyl-5,8,11-triaza-4,11-pentadecadiene (ketimine obtained by reacting methyl isobutyl ketone and diethylene triamine) were added, the solution had a viscosity of 357 centipoises.

The polyepoxide-ketimine solution was then sprayed on freshly poured portland cement concrete at a rate of 150 square feet per gallon with a Binks Number 18 spray gun using a No. 69B air nozzle and a 69P air cap.

Over 99% of the moisture was retained in the concrete. The solution applied to distressed portland cement concrete curbs provided excellent protection from freeze-thaw since the rate of disintegration was significantly reduced over a two-year period.

EXAMPLE II

The procedure of Example I was substantially repeated wherein the polyepoxide was a glycidyl polyether of 2,2-bis(4-hydroxyphenyl)propane having an average molecular weight of about 380 and an average epoxide equivalent weight of about 190. The solution was applied at 150 square feet per gallon. The coated fresh cement concrete retained 98% of the moisture during cure.

EXAMPLE III

The procedure of Example I was substantially repeated wherein the polyepoxide was a glycidyl polyester of 2,2-bis(4-hydroxyphenyl)propane having an average molecular weight of about 900 and an average epoxide equivalent weight of about 475.

The solution was applied at 200 square feet per gallon to fresh portland cement concrete and 93% of the moisture was retained during the cure. When the solution was applied at 150 square feet per gallon, 99% of the moisture was retained in the concrete. The scaling and spalling normally resulting during the "green" or partially cured period (2–3 years after mixing) was either completely absent or greatly minimized.

EXAMPLE IV

The procedure of Example I was substantially repeated wherein the butylated urea-formaldehyde resin was not employed. A completely acceptable film coating was obtained on freshly poured cement concrete, i.e., over 95% moisture retention.

EXAMPLE V

The procedure of Example I was substantially repeated wherein the ketimine was an adduct of methyl isobutyl ketone and ethylene diamine having a boiling point at 1 mm. Hg of 91–92° C. Related results were obtained.

EXAMPLE VI

The procedure of Example I is substantially repeated wherein an equivalent amount of each of the following modified ketimines are employed: (1) 2,4,12,14-tetramethyl-5,8,11-triaza-4,11-pentadecadiene is reacted with phenylglycidyl ether in the molar ratio of 1:1 at a temperature of 100° C. for several hours under a nitrogen atmosphere and (2) 2,4,12,14-tetramethyl-5,8,11-triaza-4,11-pentadecadiene is reacted with an equimolar amount of diglycidyl esters of mixed aliphatic, saturated, alpha,-alpha-dialkyl monocarboxylic acids, said acids containing from 9 to 11 carbon atoms in the molecule, at 100° C. for several hours under a nitrogen atmosphere. In both instances, related surface coatings are obtained on freshly poured portland cement concrete.

We claim as our invention:

1. A process for sealing freshly poured and finished cement concrete surfaces consisting of applying to said surface, a composition consisting of (1) an organic solvent, (2) a polyepoxide having a vic-epoxy equivalency greater than 1.0 and (3) at least 0.5 chemical equivalents based on the polyepoxide of a polyimine containing at least one —C=N— group, said polyepoxide to solvent being in the weight ratio from about 1:20 to 2:1.

2. A process for sealing freshly poured and finished cement concrete surfaces consisting of applying to said surface a composition consisting of (1) an organic solvent (2) a glycidyl polyether of a dihydric phenol or an aliphatic polyhydric alcohol and (3) at least 0.5 chemical equivalents based on the glycidyl polyether of a ketimine containing at least one —C=N— group, said glycidyl polyether to solvent being in the weight ratio from about 1:20 to 2:1.

3. A process for sealing freshly poured and finished cement concrete surfaces consisting of applying to said surface a composition consisting of (1) an organic solvent comprising an aromatic hydrocarbon solvent and an aliphatic alcohol containing up to 5 carbon atoms, (2) a glycidyl polyether of 2,2-bis(4-hydroxyphenyl)propane having an average molecular weight between about 350 and 2900 and an epoxide equivalent weight between about 180 and 2500 and (3) from 0.5 to 1.5 chemical equivalents based on the glycidyl polyether of a ketimine prepared by reacting an aliphatic or cycloaliphatic amine containing at least one primary amino group and up to 20 carbon atoms with an aliphatic ketone containing from 3 to 12 carbon atoms, said glycidyl polyether to solvent being in the weight ratio from about 1:20 to 2:1.

4. A process as in claim 3 wherein the organic solvent comprises from 70–95 parts by volume of xylene and from 5–30 parts by volume of n-butyl alcohol.

5. A process as in claim 3 wherein the glycidyl polyethyl has an average molecular weight of about 1060 and an approximate epoxide equivalent weight of about 650.

6. A process as in claim 3 wherein up to 150 parts per one hundred parts of glycidyl polyether of an inert filler is employed.

7. A process as in claim 3 wherein the ketimine is 2,4,12,14-tetramethyl-5,8,11-triaza-4,11-pentadecadiene.

8. A process as in claim 3 wherein up to 25 parts per one-hundred parts by weight of glycidyl polyether of a butylated ureaformaldehyde resin is employed.

References Cited

UNITED STATES PATENTS 2,765,288  10/1956  Whittier et al.
3,337,606  8/1967  Floyd _____ 260—47 XR ALFRED L. LEAVITT, *Primary Examiner.*

W. F. CYRON, *Assistant Examiner.*

U.S. Cl. X.R.

117—161